US005564668A

United States Patent [19]
Crowe, II

[11] Patent Number: 5,564,668
[45] Date of Patent: Oct. 15, 1996

[54] COMPUTER STAND FOR VEHICLES

[76] Inventor: Marvin E. Crowe, II, 615 Windsor Run, Bloomfield Hills, Mich. 48304

[21] Appl. No.: 389,112

[22] Filed: Feb. 15, 1995

[51] Int. Cl.$^6$ .................................................. E04G 3/00
[52] U.S. Cl. ........................................ 248/284.1; 248/918
[58] Field of Search ............................ 248/284.1, 291.1, 248/292.11, 918, 920, 921

[56]  References Cited

U.S. PATENT DOCUMENTS

| Re. 29,811 | 10/1978 | Norris . | |
|---|---|---|---|
| 3,719,388 | 3/1973 | Fortnam . | |
| 3,858,937 | 1/1975 | Norris . | |
| 3,885,831 | 5/1975 | Rasmussen . | |
| 4,014,594 | 3/1977 | Hain . | |
| 4,312,538 | 1/1982 | Kennedy et al. . | |
| 4,691,886 | 9/1987 | Wendling et al. | 248/920 |
| 4,729,533 | 3/1988 | Hillary et al. | 248/920 |
| 4,989,813 | 2/1991 | Kim et al. | 248/920 |
| 5,207,791 | 5/1993 | Scherbarth | 248/918 |

*Primary Examiner*—Leslie A. Braun
*Assistant Examiner*—Willie Berry, Jr.
*Attorney, Agent, or Firm*—Brooks & Kushman P.C.

[57]  ABSTRACT

A vehicle computer tray assembly is adjustable between a plurality of positions for user access and storage. The computer stand comprises a base for mounting in a vehicle, and a support member pivotally mounted at one end to the base. A computer tray is pivotally mounted with respect to the other end of the support member. A locking mechanism is operatively connected with respect to both pivotal connections, whereby to simultaneously releasably lock and unlock pivotal movement of both the base and computer tray with respect to the support member. The tray is configured to support a lap-top computer, fax machine or comparable items.

18 Claims, 2 Drawing Sheets

COMPUTER STAND FOR VEHICLES

TECHNICAL FIELD

This invention relates to vehicle trays, and more particularly to collapsible trays adapted for supporting a computer in a vehicle.

BACKGROUND ART

With the advent of notebook or lap-top computers, computer users have been able to carry and use computers in places which heretofore were not conducive to computer use. Lap-top computers may now be used when traveling in taxi cabs, airplanes, trains, etc. This ability of lap-top computers to travel has had a significant impact upon the flexibility of computer use. Travel time for business people has become productive as a result of this development.

In certain professions, such as consulting, sales, construction, etc., it is desirable to have access to a lap-top computer from the driver's seat or passenger's seat of a vehicle. Professionals who spend a large amount of time driving a vehicle can gain substantial benefits from having a lap-top computer which is easily accessible from the driver's seat.

Presently, no known system exists which provides support for a lap-top computer in a vehicle in a manner which is easily accessible to the driver, and which is collapsible when the computer is not needed.

It can be awkward for a driver or passenger to support a lap-top computer on his or her lap, or on the seat or console adjacent the driver in an attempt to comfortably use the computer. Accordingly, it is desirable to develop a support structure for a computer which is adapted for mounting in a vehicle. This system must provide easy access to the driver, and must be collapsible so that the computer and support structure may be stowed when not in use, and returned to the use position.

SUMMARY OF THE INVENTION

The present invention contemplates a computer stand for a vehicle which is movable between a storage position and a plurality of use positions. The computer stand is adjustable for user convenience, and is configured to support a lap-top computer, fax machine, or comparable item.

The present inventive computer stand for a vehicle comprises a base adapted for mounting in the vehicle, and a support member pivotally coupled at a first end to the base. A computer shelf or tray is pivotally coupled with respect to a second end of the support member. A locking mechanism is operatively connected with respect to the base and tray, whereby to simultaneously releasably lock pivotal movement of both the base and tray with respect to the support member.

An alternative embodiment of the present invention provides a computer stand for a vehicle, which comprises a support member having first and second annular openings formed therethrough near each end. The support member has first and second slots extending from an outer surface into communication with each of the annular openings. The slots allow the internal diameter of each of the annular openings to be reduced by compression of the support member adjacent the slots. First and second pins are received in the first and second annular openings, respectively. A base is rigidly connected with respect to one of the first and second pins. A computer tray is connected to the other of the first and second pins. A tension rod is mounted at one end to the support member adjacent one of the slots. A cam mechanism is connected to the opposite end of the support member adjacent the other of the slots for exerting tension on the tension rod to compress the support member, thereby reducing the internal diameter of the annular openings and frictionally engaging the first and second pins to lock them against rotation.

Accordingly, an object of the present invention is to provide a computer stand for a vehicle which is adapted to hold a lap-top computer in a position easily accessible to a vehicle driver, and which is easily collapsible to a stowed position.

A further object of the present invention is to provide a computer stand for a vehicle which is infinitely adjustable within a range of motion, and which includes a pair of pivot joints which are operable by a single clamp lever.

Yet another object of the present invention is to provide an article stand for a vehicle which is adapted to conveniently support articles, such as lap-top computers, fax machines, electronic equipment or media, etc., in a convenient location for driver or passenger access, and which is easily collapsible to a stowed position.

The above objects, and other objects, features and advantages of the present invention are readily apparent from the following detailed description of the best mode for carrying out the invention when taken in conjunction with the accompanying drawings.

DETAILED DESCRIPTION OF PREFERRED EMBODIMENTS

Figure 1:
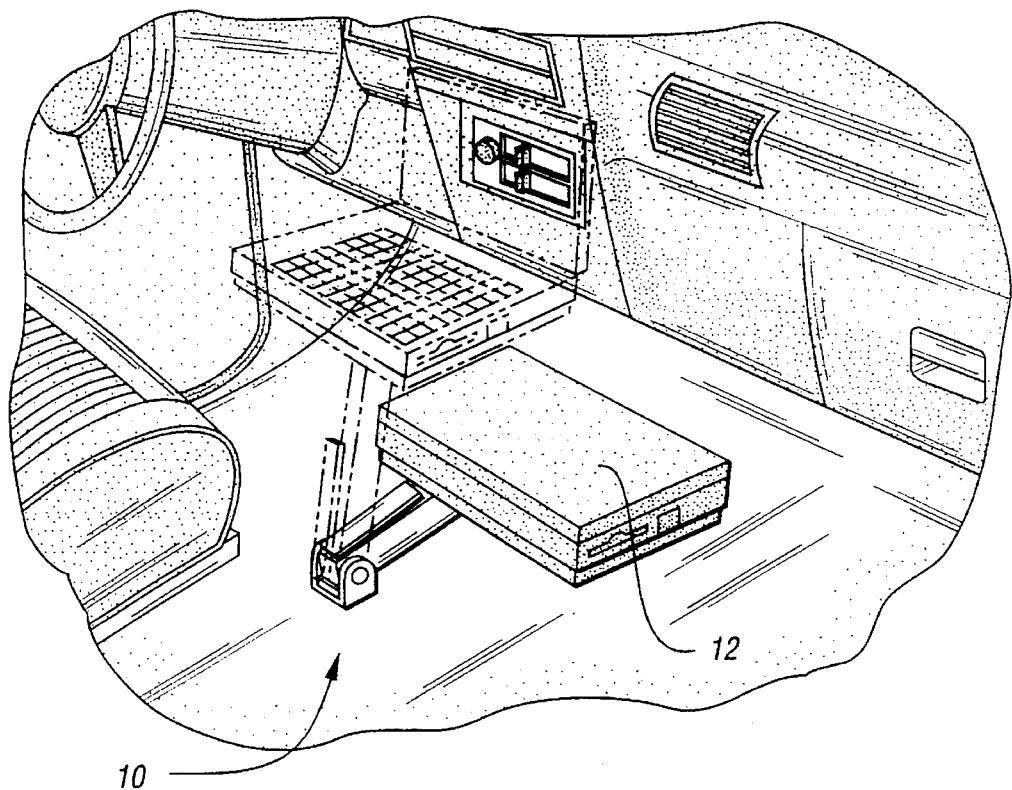
FIG. 1 shows a perspective view of a computer tray installed in a vehicle in accordance with the present invention.

FIG. 1 shows a vehicle computer tray assembly 10 installed in a vehicle. The assembly 10 is adapted to support a lap-top computer 12, or other similar object in a vehicle. In FIG. 1, the computer tray is shown in a collapsed position for storage, and the computer tray is also shown in an upright use position in phantom. The assembly 10 may be pivoted through a plurality of support positions for storage or use.

Figure 2:
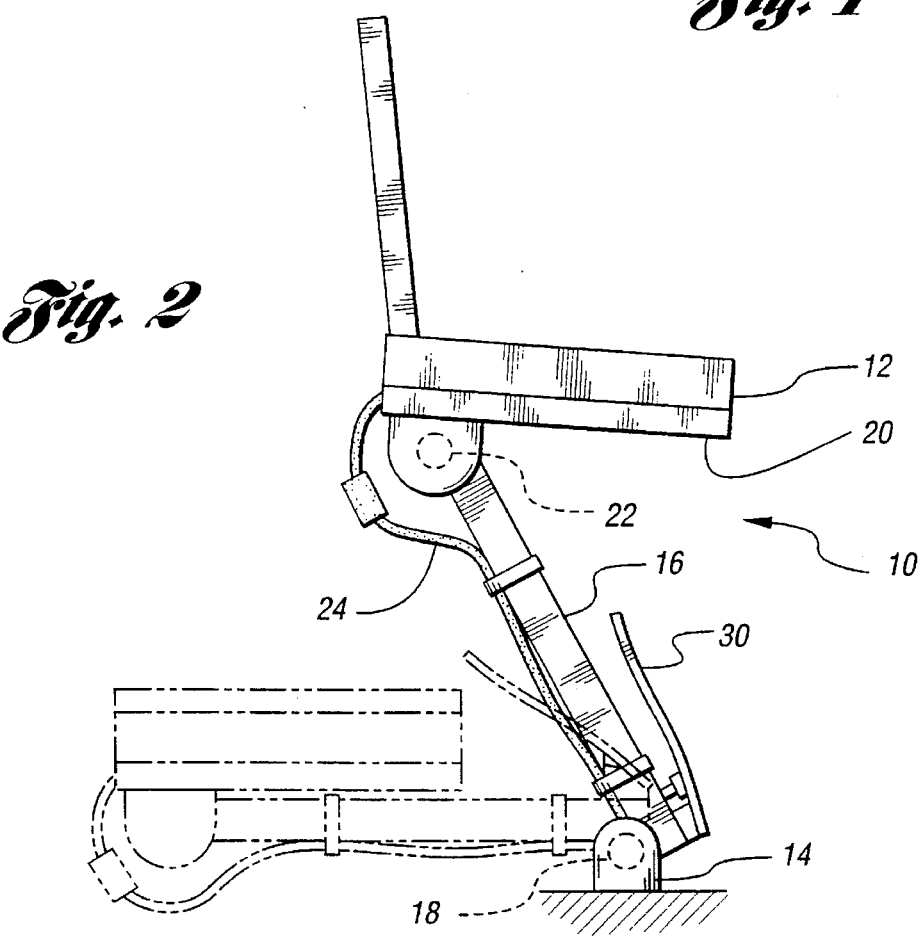
FIG. 2 shows a side view of the vehicle computer tray in a use position in accordance with the present invention, with the collapsed position shown in phantom.

Referring to FIG. 2, the vehicle computer tray assembly 10 is shown in side view. The design comprises a base 14 adapted for mounting in a vehicle. A support member 16 is pivotally mounted with respect to the base 14 at the first pivot pin 18. A support tray 20 is pivotally mounted with respect to the support member 16 about the second pivot pin 22. An electrical cable 24 extends along the support member 16 to provide power to the computer 12.

Figure 3:
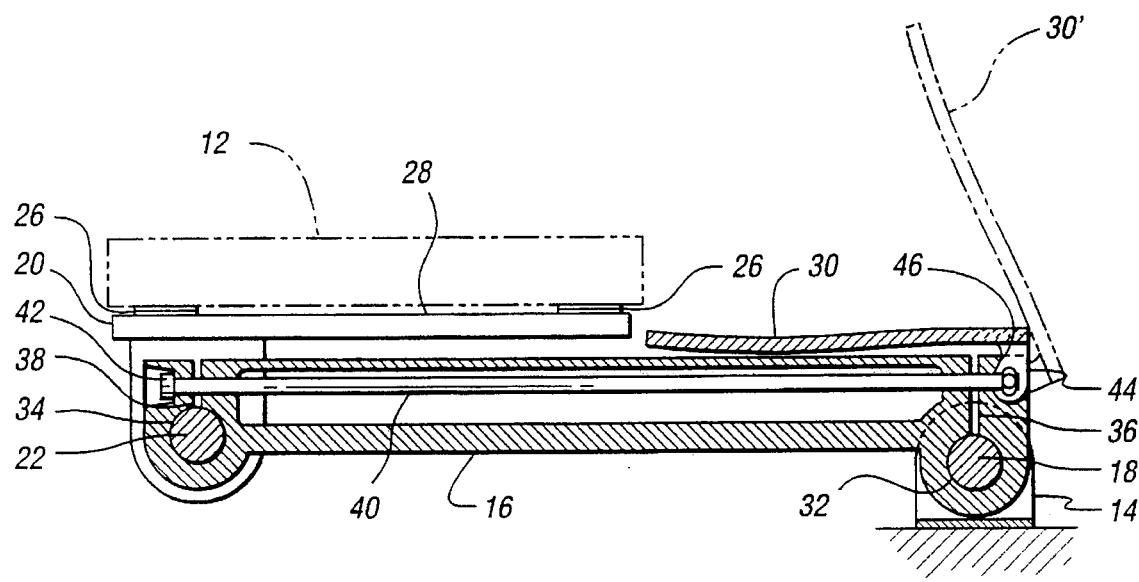
FIG. 3 shows a cross-section of a first embodiment of the vehicle computer tray in accordance with the present invention.

Referring now to FIG. 3, a computer 12 is shown secured to the tray 20 by means of a plurality of Velcro strips 26 secured to the upper surface 28 of the tray 20.

A lever 30 is used to clamp both pivot pins 18,22 from pivotal movement with respect to the support member 16. The pivot pins 18,22 are rigidly secured with respect to the base 14 and the tray 20, respectively.

The support member 16 receives the first and second pivot pins 18,22 in apertures 32,34, respectively. Slots 36,38 are formed through the support member 16 in communication with the apertures 32,34. A tension rod 40 is operatively connected to opposing ends of the support member 16. The rod 40 in combination with the cam member 44 operates to pinch the slots 36,38, thereby reducing the internal diameter of the apertures 32,34 in order to rigidly secure the pivot pins 18,22 within the apertures 32,34. In this manner, the lever 30 may be used to simultaneously releasably lock pivotal movement of both the first and second pivot pins with respect to the support member 16. This allows the user the capability to infinitely adjust the computer tray assembly 10 within a range of motion.

The rod 40 includes a threaded lower end which is fitted with a nut 42. The upper end of the rod 40 is pivotally connected to cam member 44 which bears against a cam surface 46 positioned in the end of the support member 16. The lever 30 is integrally connected to the cam member 44 for movement between positions 30 and 30' shown in FIG. 3. In the locked position, the lever 30 is positioned adjacent the support member 16. In this position, tension forces are provided to the tension rod, and the cam member 44 pushes against the cam surface 46 to decrease the diameter of the first aperture 32 to pinch the first pivot pin 18. Also, tension forces from the rod 40 acting on the nut 42 pinch the slot 38, thereby reducing the internal diameter of the aperture 34 to secure the second pivot pin 22 therein.

In the lever position 30' shown in phantom in FIG. 3, the cam member 44 is disengaged from the cam surface 46, thereby releasing tension in the rod 40 to allow expansion of the slots 36,38 and enlargement of the internal diameters of the apertures 32,34 whereby to release the pivot pins 18,22 for rotational movement with respect to the support member 16. A cam and rod arrangement of this type is shown in U.S. Pat. No. Re. 29,811, which is hereby incorporated by reference in its entirety.

Figure 4:
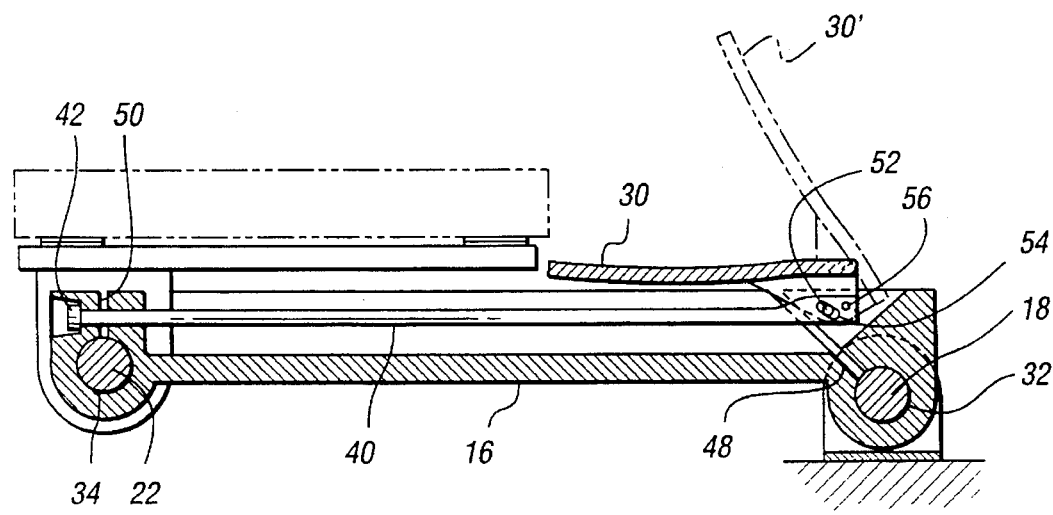
FIG. 4 shows a cross-section of an alternative embodiment of a vehicle computer tray in accordance with the present invention.

An alternative embodiment of the lever and rod configuration of the present invention is shown in FIG. 4. In this embodiment, the support member 16 includes slots 48,50 formed therein. The tension rod 40 passes through the slot 50, and transversely at an angle through the slot 48. A third pin 52 passes through the support member 16 and through an opening 54 formed in a portion of the handle 30. A fourth pin 56 also passes through the rod 40 and the portion of the handle 30 through which the third pin 52 passes.

Counterclockwise movement of the handle 30 causes tension in the rod 40. The tension in the rod 40 draws the nut 42 toward the slot 50 in order to pinch the slot and decrease the internal diameter of the aperture 34 to secure the pivot pin 22 therein. At the same time, rod 40 transmits tension through the pin 52 to the support member 16 adjacent the slot 48 to pinch the slot 48 and reduce the internal diameter of the aperture 32 to secure the pivot pin 18 from rotational movement with respect thereto. The lever 30 remains taut due to the toggle type movement provided by the pins 56 and 52 and the portion of the lever 30 described above. A mechanism of this type is described in U.S. Pat. No. 3,885,831, which is hereby incorporated by reference in its entirety.

While the best modes for carrying out the invention have been described in detail, those familiar with the art to which this invention relates will recognize various alternative designs and embodiments for practicing the invention. Thus, the above described preferred embodiments are intended to be illustrative of the invention which may be modified within the scope of the following appended claims.

What is claimed is:

1. A computer stand for a vehicle, comprising:

a base adapted for mounting in the vehicle;

a support member having first and second ends, said first end being pivotally mounted to said base;

a computer tray pivotally mounted to said second end of said support member;

a locking mechanism operatively connected with respect to the pivotally mounted first and second ends, whereby to simultaneously releasably lock and unlock pivotal movement of both said first and second ends with respect to said support member; and wherein said locking mechanism comprises a handle operative to clamp the pivotal motions of the first and second ends by a single motion of the handle.

2. The computer stand of claim 1, wherein said locking mechanism is configured so that said clamp handle projects angularly away from said support member when said locking mechanism is released.

3. The computer stand of claim 2, further comprising:

a first pivot pin rigidly mounted with respect to said base and pivotally coupled to said first end of said support member;

a second pivot pin rigidly mounted to said tray and pivotally coupled to said second end of said support member;

said support member including first and second split bearings formed integrally at said first and second ends of said support member, respectively, for journalling cooperation with said first and second pins; and said locking mechanism including a tension rod operatively connected between said split bearings, said tension rod and being connected to said handle for clamping and unclamping movement.

4. The computer stand of claim 3, wherein said split bearings having an internal diameter and said first and second pivot pins each having an external diameter, said internal diameters being slightly greater than said external diameter to allow free rotation of said pins within said split bearings.

5. The computer stand of claim 4, wherein said tension rod being operable to selectively compress said split bearings and reduce said internal diameters to frictionally engage said pivot pins inside said split bearings to prevent relative rotation therebetween.

6. The computer stand of claim 1, wherein said computer tray has an upper surface with a plurality of attachment devices secured thereon.

7. The computer stand of claim 1, wherein said computer tray comprises:

a seat member; and four side walls extending perpendicularly with respect to said seat member about the periphery thereof to form an opening for receiving a computer.

8. A computer stand for a vehicle, comprising:

a support member having an outer surface and having first and second annular openings formed therethrough near each end, said annular openings each having an internal diameter, said support member having first and second slots formed therein extending from an outer surface thereof into communication with each of said annular openings, and each of said slots allowing the internal diameter of each of the annular openings to be reduced by compression of the support member adjacent the slots;

a channel formed through the support member generally transverse to the axis of each of the annular openings and communicating with the slots;

first and second pins received in said first and second annular openings, respectively, each pin having an external diameter slightly less than the internal diameter of the respective annular opening in the uncompressed state, allowing free rotation thereof;

a base rigidly connected with respect to one of said first and second pins, said base adapted for attachment in the vehicle;

a computer tray rigidly connected with respect to the other of said first and second pins, said computer tray adapted for supporting a computer thereon;

a tension rod extending through said channel and mounted at one end to said support member adjacent one of said slots; and a cam mechanism connected to the opposite end of said support member adjacent the other of said slots for exerting tension on the tension rod relative to the support member to compress the support member, thereby reducing the internal diameter of said annular openings and frictionally engaging the first and second pins to lock them against rotations, wherein said cam mechanism comprises a handle operative to cause frictional engagement between said annular opening and said first and second pins by a single motion of the clamp handle to a clamping position.

9. The computer stand of claim 8, wherein said cam mechanism is configured so that said clamp handle projects angularly away from said support member when said cam mechanism is released.

10. The computer stand of claim 8, wherein said computer tray comprises an upper surface having a plurality of Velcro pieces secured thereon.

11. The computer stand of claim 8, wherein said computer tray comprises:

a seat member; and four side walls extending perpendicularly with respect to said seat member about the periphery thereof to form an opening for receiving a computer.

12. An article stand for a vehicle, comprising:

a base adapted for mounting in the vehicle;

a support member having first and second ends, and pivotally mounted at said first end to said base;

an article tray pivotally mounted to said second end of said support member;

a locking mechanism operatively connected with respect to said first and second ends of said support member to simultaneously releasably lock pivotal motion of said support member both with respect to said base and said tray; and wherein said locking mechanism comprises a handle operative to clamp both pivotal motions by a single motion of the clamp handle to a clamping position.

13. The article stand of claim 12, wherein said locking mechanism is configured so that said clamp handle projects angularly away from said support member when said locking mechanism is released.

14. The article stand of claim 13, further comprising:

first and second split bearings formed integrally at said first and second ends of said support member, respectively;

first and second pins in journalling cooperation with said first and second split bearings, respectively; and said locking mechanism including a tension rod operatively connected between said split bearings, said tension rod being connected to said handle for clamping and unclamping movement.

15. The article stand of claim 14, wherein said split bearings having an internal diameter and said first and second pivot pins having an external diameter, said internal diameter being slightly greater than said external diameter to allow free rotation of said pins within said split bearings.

16. The article stand of claim 15, wherein said tension rod being operable to selectively compress said split bearings to frictionally engage said pivot pins inside said split bearings to prevent relative rotation therebetween.

17. The article stand of claim 12, wherein said article tray comprises an upper surface having a plurality of Velcro pieces secured thereon.

18. The article stand of claim 12, wherein said article tray comprises:

a seat member; and four side walls extending perpendicularly with respect to said seat member about the periphery thereof to form an opening for receiving an article.

* * * * *

UNITED STATES PATENT AND TRADEMARK OFFICE
CERTIFICATE OF CORRECTION

PATENT NO. : 5,564,668
DATED : October 15, 1996
INVENTOR(S) : Marvin E. Crowe, II It is certified that error appears in the above-identified patent and that said Letters Patent is hereby corrected as shown below:

Column 5, line 30, after "against" replace "rotations" with --rotation--.

Column 5, line 32, after "annular" replace "opening" with --openings--.

Signed and Sealed this

Twenty-second Day of April, 1997

*Attest:*

*Attesting Officer*

BRUCE LEHMAN

*Commissioner of Patents and Trademarks*